United States Patent
Tero et al.

(10) Patent No.: US 12,009,977 B2
(45) Date of Patent: *Jun. 11, 2024

(54) GUIDED CONFIGURATION ITEM CLASS CREATION IN A REMOTE NETWORK MANAGEMENT PLATFORM

(71) Applicant: ServiceNow, Inc., Santa Clara, CA (US)

(72) Inventors: Vivian Tero, San Francisco, CA (US); Chinna Polinati, Snoqualmie, WA (US); Madhavi Puvvada, Sammamish, WA (US); Purushottam Amradkar, Sammamish, WA (US); Manish Gupta, Redmond, WA (US); Brandon Trudel, Bellevue, WA (US); Guarav Yakhmi, Rednibd, WA (US); Jesus Antonio Castro Cisneros, Santa Clara, CA (US); Viral Shah, Bothell, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,580

(22) Filed: May 16, 2022

(65) Prior Publication Data
US 2022/0278898 A1 Sep. 1, 2022

Related U.S. Application Data

(63) Continuation of application No. 17/445,269, filed on Aug. 17, 2021, now Pat. No. 11,336,524, which is a (Continued)

(51) Int. Cl.
*G06F 15/173* (2006.01)
*G06F 3/0481* (2022.01)
(Continued)

(52) U.S. Cl.
CPC ........ *H04L 41/0859* (2013.01); *G06F 3/0481* (2013.01); *G06F 3/0482* (2013.01);
(Continued)

(58) Field of Classification Search
CPC ..... H04L 41/0859; H04L 67/55; H04L 67/60; H04L 41/0803; H04L 41/0893;
(Continued)

(56) References Cited

U.S. PATENT DOCUMENTS 5,978,594 A 11/1999 Bonnell
5,999,179 A * 12/1999 Kekic ................. H04L 41/0213
715/969

(Continued)

OTHER PUBLICATIONS

Systems Center, How to Create a Class Using Inheritance in the Authoring Tool [retrieved from internet on Nov. 20, 2019]; <URL: https://web.archive.org/web/20140329043357/https://systemscenter.ru/sm_authoringguide.en/html/a761aee5-4a12-445e-bd72-7302715711bc.htm> published on Mar. 29, 2014 as per Wayback Machine.

*Primary Examiner* — Liang Che A Wang
(74) *Attorney, Agent, or Firm* — Fletcher Yoder, PC

(57) ABSTRACT

A system may include a database disposed within a remote network management platform, a server device disposed in the platform, and a client device. The database may contain representations of configuration items, such as computing devices and software applications associated with the managed network. The server device may provide a graphical user interface including a sequence of panes to the client device. The sequence of panes may include an identifier pane, an identification rules pane, and a reconciliation pane. Each pane may include data entry fields that are operable to define a new class of configuration item. The server device may receive, by way of the graphical user interface, a definition of the new class that uniquely identifies configu-
(Continued)

ration items of a particular type using at least the attributes. The server may store, in the database, the definition of the new class.

20 Claims, 13 Drawing Sheets

Related U.S. Application Data continuation of application No. 16/989,703, filed on Aug. 10, 2020, now Pat. No. 11,108,635, which is a continuation of application No. 16/417,216, filed on May 20, 2019, now Pat. No. 10,742,504, which is a continuation of application No. 15/890,017, filed on Feb. 6, 2018, now Pat. No. 10,320,611, which is a continuation of application No. 15/728,867, filed on Oct. 10, 2017, now abandoned.

(60) Provisional application No. 62/568,087, filed on Oct. 4, 2017.

(51) Int. Cl.

| | |
|---|---|
| *G06F 3/0482* | (2013.01) |
| *G06F 3/04847* | (2022.01) |
| *G06F 3/0486* | (2013.01) |
| *G06F 9/451* | (2018.01) |
| *G06F 9/46* | (2006.01) |
| *G06F 9/48* | (2006.01) |
| *G06F 9/50* | (2006.01) |
| *G06F 9/54* | (2006.01) |
| *G06F 11/14* | (2006.01) |
| *G06F 11/30* | (2006.01) |
| *G06F 11/34* | (2006.01) |
| *G06F 16/18* | (2019.01) |
| *G06F 16/242* | (2019.01) |
| *G06F 16/2457* | (2019.01) |
| *G06F 16/2458* | (2019.01) |
| *G06F 16/248* | (2019.01) |
| *G06F 16/27* | (2019.01) |
| *G06F 16/30* | (2019.01) |
| *G06F 16/904* | (2019.01) |
| *G06F 16/951* | (2019.01) |
| *G06F 40/18* | (2020.01) |
| *G06F 40/186* | (2020.01) |
| *G06Q 10/0631* | (2023.01) |
| *G06Q 10/0635* | (2023.01) |
| *G06Q 10/0639* | (2023.01) |
| *G06Q 10/067* | (2023.01) |
| *G06Q 30/018* | (2023.01) |
| *G06Q 30/0601* | (2023.01) |
| *G06Q 40/12* | (2023.01) |
| *G06Q 50/18* | (2012.01) |
| *H04L 9/40* | (2022.01) |
| *H04L 41/0803* | (2022.01) |
| *H04L 41/084* | (2022.01) |
| *H04L 41/0859* | (2022.01) |
| *H04L 41/0893* | (2022.01) |
| *H04L 41/12* | (2022.01) |
| *H04L 41/22* | (2022.01) |
| *H04L 41/5006* | (2022.01) |
| *H04L 43/045* | (2022.01) |
| *H04L 43/08* | (2022.01) |
| *H04L 43/50* | (2022.01) |
| *H04L 67/55* | (2022.01) |
| *H04L 67/60* | (2022.01) |
| *G06F 3/0484* | (2022.01) |
| *G06F 9/445* | (2018.01) |
| *G06F 21/53* | (2013.01) |
| *G06F 21/57* | (2013.01) |
| *H04L 41/08* | (2022.01) |
| *H04L 41/5009* | (2022.01) |
| *H04L 67/00* | (2022.01) |
| *H04L 67/12* | (2022.01) |

(52) U.S. Cl.
CPC ........ *G06F 3/04847* (2013.01); *G06F 3/0486* (2013.01); *G06F 9/451* (2018.02); *G06F 9/461* (2013.01); *G06F 9/4881* (2013.01); *G06F 9/5038* (2013.01); *G06F 9/547* (2013.01); *G06F 11/14* (2013.01); *G06F 11/3006* (2013.01); *G06F 11/3452* (2013.01); *G06F 16/1873* (2019.01); *G06F 16/2423* (2019.01); *G06F 16/24578* (2019.01); *G06F 16/2474* (2019.01); *G06F 16/2477* (2019.01); *G06F 16/248* (2019.01); *G06F 16/27* (2019.01); *G06F 16/30* (2019.01); *G06F 16/904* (2019.01); *G06F 16/951* (2019.01); *G06F 40/18* (2020.01); *G06F 40/186* (2020.01); *G06Q 10/06314* (2013.01); *G06Q 10/06315* (2013.01); *G06Q 10/0635* (2013.01); *G06Q 10/06393* (2013.01); *G06Q 10/067* (2013.01); *G06Q 30/018* (2013.01); *G06Q 30/0603* (2013.01); *G06Q 30/0635* (2013.01); *G06Q 30/0641* (2013.01); *G06Q 40/12* (2013.12); *G06Q 50/184* (2013.01); *H04L 41/0803* (2013.01); *H04L 41/0843* (2013.01); *H04L 41/0893* (2013.01); *H04L 41/12* (2013.01); *H04L 41/22* (2013.01); *H04L 41/5006* (2013.01); *H04L 43/045* (2013.01); *H04L 43/08* (2013.01); *H04L 43/50* (2013.01); *H04L 63/10* (2013.01); *H04L 63/1433* (2013.01); *H04L 63/20* (2013.01); *H04L 67/55* (2022.05); *H04L 67/60* (2022.05); *G06F 3/0484* (2013.01); *G06F 9/44505* (2013.01); *G06F 21/53* (2013.01); *G06F 21/577* (2013.01); *H04L 41/0879* (2013.01); *H04L 41/5016* (2013.01); *H04L 67/12* (2013.01); *H04L 67/34* (2013.01)

(58) Field of Classification Search
CPC ......... H04L 41/12; H04L 41/22; H04L 43/08; H04L 67/12; H04L 67/34
USPC ................. 709/203, 217, 223, 226, 229
See application file for complete search history.

(56) References Cited

U.S. PATENT DOCUMENTS

| | | | |
|---|---|---|---|
| 6,163,776 A * | 12/2000 | Periwal | ............... G06F 16/289 |
| 6,163,887 A | 12/2000 | Periwal | |
| 6,321,229 B1 | 11/2001 | Goldman | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,382,371 B1 * | 6/2008 | Ciabarra | ............. G06F 11/3495 |
| | | | 709/224 |
| 7,392,300 B2 | 6/2008 | Anantharangachar | |
| 7,617,073 B2 | 11/2009 | Trinon | |
| 7,685,167 B2 | 3/2010 | Mueller | |
| 7,716,353 B2 | 5/2010 | Golovinksy | |
| 7,769,718 B2 | 8/2010 | Murley | |
| 7,877,783 B1 | 1/2011 | Cline | |
| 7,925,981 B2 | 4/2011 | Pourheidari | |

(56) References Cited

U.S. PATENT DOCUMENTS

| | | | |
|---|---|---|---|
| 7,933,927 B2 | 4/2011 | Dee | |
| 7,941,506 B2 | 5/2011 | Bonal | |
| 7,945,860 B2 | 5/2011 | Vambenepe | |
| 8,082,222 B2 | 12/2011 | Rangarajan | |
| 8,346,752 B2 | 1/2013 | Sirota | |
| 8,380,645 B2 | 2/2013 | Kowalski | |
| 8,402,127 B2 | 3/2013 | Solin | |
| 8,554,750 B2 | 10/2013 | Rangaranjan | |
| 8,612,408 B2 | 12/2013 | Trinon | |
| 8,646,093 B2 | 2/2014 | Myers | |
| 8,683,032 B2 | 3/2014 | Spinelli | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,907,988 B2 | 12/2014 | Poston | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,261,372 B2 | 2/2016 | Cline | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,534,903 B2 | 1/2017 | Cline | |
| 9,535,737 B2 | 1/2017 | Joy | |
| 9,613,070 B2 | 4/2017 | Kumar | |
| 9,631,934 B2 | 4/2017 | Cline | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 9,967,162 B2 | 5/2018 | Spinelli | |
| 10,002,203 B2 | 6/2018 | George | |
| 2002/0095654 A1* | 7/2002 | Fukase | G06F 8/30 717/106 |
| 2003/0105814 A1* | 6/2003 | Kamiya | G06Q 30/02 709/203 |
| 2004/0230636 A1 | 11/2004 | Masuoka et al. | |
| 2006/0161313 A1 | 7/2006 | Rogers et al. | |
| 2007/0239700 A1 | 10/2007 | Ramachandran | |
| 2008/0244754 A1* | 10/2008 | Curren | G06F 21/105 726/27 |
| 2009/0144319 A1* | 6/2009 | Panwar | G06F 16/25 707/999.102 |
| 2009/0164474 A1* | 6/2009 | Noumeir | G16H 30/40 707/E17.031 |
| 2010/0161577 A1 | 6/2010 | Morozov | |
| 2010/0179939 A1 | 7/2010 | Rangarajan et al. | |
| 2010/0179945 A1 | 7/2010 | Rangarajan et al. | |
| 2010/0185658 A1 | 7/2010 | Kowalski | |
| 2011/0161288 A1 | 6/2011 | Morimoto et al. | |
| 2011/0225114 A1* | 9/2011 | Gotthardt | G16H 10/20 706/50 |
| 2012/0102383 A1* | 4/2012 | Liu | G06F 40/111 715/202 |
| 2012/0162265 A1* | 6/2012 | Heinrich | G06F 3/04883 345/173 |
| 2013/0111323 A1* | 5/2013 | Taghaddos | G06F 40/174 715/223 |
| 2014/0157142 A1* | 6/2014 | Heinrich | G06F 3/0412 715/744 |
| 2015/0161189 A1 | 6/2015 | Trinon et al. | |

* cited by examiner

CI CLASS MANAGER 600

Identifier ⌄ | 602 \> Attributes | 604 \> Identification Rules | 606 \> Dependencies | 608 \> Reconciliation Rules 610

[ Added ] [ All ]

Criterion attributes that uniquely identify the CI which are created specifically for the CI class

[ Cancel ] [ Next ] 614

| Column Label | Column Name | Type | Reference | Max Length | Mandatory | Display | Identifier |
|---|---|---|---|---|---|---|---|
| ⊘  New CI Label | ⊗ | | | | | | |
| + | | | | | | | |

PROVIDING, BY A SERVER DEVICE DISPOSED WITHIN THE REMOTE NETWORK MANAGEMENT PLATFORM TO A CLIENT DEVICE ASSOCIATED WITH A MANAGED NETWORK, A GRAPHICAL USER INTERFACE INCLUDING A SEQUENCE OF PANES, WHEREIN A FIRST PANE OF THE SEQUENCE OF PANES INCLUDES A FIRST DATA ENTRY FIELD FOR SPECIFICATION OF AN IDENTIFIER OF THE NEW CLASS OF CONFIGURATION ITEM, WHEREIN A SECOND PANE OF THE SEQUENCE OF PANES INCLUDES A SECOND DATA ENTRY FIELD FOR SPECIFICATION OF CONFIGURATION ITEM ATTRIBUTES THAT ARE OPERABLE TO UNIQUELY IDENTIFY CONFIGURATION ITEMS OF THE NEW CLASS, WHEREIN THE CONFIGURATION ITEMS REPRESENT AT LEAST COMPUTING DEVICES AND SOFTWARE PROGRAMS DISPOSED WITHIN THE MANAGED NETWORK, AND WHEREIN A THIRD PANE OF THE SEQUENCE OF PANES INCLUDES A THIRD DATA ENTRY FIELD FOR SPECIFICATION OF AUTHORITATIVE DEVICES THAT ARE PERMITTED TO UPDATE THE DATABASE WITH INFORMATION RELATED TO CONFIGURATION ITEMS OF THE NEW CLASS ← 700

RECEIVING, BY THE SERVER DEVICE BY WAY OF THE GRAPHICAL USER INTERFACE, A DEFINITION OF A NEW CLASS OF CONFIGURATION ITEM THAT UNIQUELY IDENTIFIES CONFIGURATION ITEMS OF A PARTICULAR TYPE ← 702

STORING, IN A DATABASE THAT CONTAINS REPRESENTATIONS OF CONFIGURATION ITEMS ASSOCIATED WITH THE MANAGED NETWORK, THE DEFINITION OF THE NEW CLASS OF CONFIGURATION ITEM ← 704

FIG. 7

GUIDED CONFIGURATION ITEM CLASS CREATION IN A REMOTE NETWORK MANAGEMENT PLATFORM

CROSS-REFERENCE TO RELATED APPLICATION

This application is a continuation of U.S. application Ser. No. 17/445,269, filed Aug. 17, 2021, which is a continuation of U.S. application Ser. No. 16/989,703, filed Aug. 20, 2020 (now U.S. Pat. No. 11,108,635), which is a continuation of U.S. application Ser. No. 16/417,216 filed on May 20, 2019 (now U.S. Pat. No. 10,742,504), which is a continuation of U.S. application Ser. No. 15/890,017 filed Feb. 6, 2018 (now U.S. Pat. No. 10,320,611), which is a continuation of U.S. application Ser. No. 15/728,867 filed on Oct. 10, 2017, which claims benefit to Provisional Application No. 62/568,087, filed Oct. 4, 2017, which are hereby incorporated by reference in their entirety.

BACKGROUND

An enterprise may use thousands of individual computing devices to efficiently facilitate and manage its many inter-related operations. Each such computing device may have software installed thereon. A configuration management database may include representations of configuration items associated with the enterprise. That is, the configuration management database may include representations of the computing devices, the software applications, relationships therebetween, and configurations thereof. Such representations might be used by the enterprise in information technology service management, operations management, asset management, configuration management, compliance, and so on. Thus, inaccuracies in the representations may negatively affect the efficiency with which these operations are performed.

SUMMARY

The embodiments herein involve, but are not limited to, ways in which an enterprise may facilitate the population of a database with representations of computing devices, software applications, relationships therebetween, and configurations thereof. Such devices, programs, and relationships may be referred to as "configuration items." A computing device associated with the enterprise may interact with a configuration item class management tool that facilitates the creation of new classes of configuration item, representations of which are stored within the configuration management database. The configuration item class management tool may guide creation of the new classes of configuration items so as to ensure that information representative of configuration items of the enterprise that is stored in the CMDB is accurate, consistent, and up to date.

Accordingly, a first example embodiment may involve a system that may include a database disposed within a remote network management platform. The database may contain representations of configuration items associated with a managed network. The configuration items may represent at least computing devices and software applications disposed within the managed network. The system may also include a server device disposed within the remote network management platform. The server device may be configured to (i) provide a graphical user interface including a sequence of panes, (ii) receive, by way of the graphical user interface, a definition of a new class that uniquely identifies configuration items of a particular type, and (iii) store, in the database, the definition of the new class. An identifier pane of the sequence of panes may include first data entry fields for specification of an identifier of the new class. An identification rules pane of the sequence of panes may include second data entry fields for specification of configuration item attributes that are operable to uniquely identify configuration items of the new class. A reconciliation pane of the sequence of panes may include third data entry fields for specification of authoritative devices that are permitted to modify, within the database, one or more configuration item attributes of configuration items of the new class. The identifier pane may appear before the identification rules pane in the sequence of panes, and the identification rules pane may appear before the reconciliation pane in the sequence of panes.

In a second example embodiment, a method may include providing, by a server device disposed within the remote network management platform to a client device associated with a managed network, a graphical user interface including a sequence of panes. An identifier pane of the sequence of panes may include first data entry fields for specification of an identifier of the new class. An identification rules pane of the sequence of panes may include second data entry fields for specification of configuration item attributes that are operable to uniquely identify configuration items of the new class. A reconciliation pane of the sequence of panes may include third data entry fields for specification of authoritative devices that are permitted to modify, within the database, one or more configuration item attributes of configuration items of the new class. The identifier pane may appear before the identification rules pane in the sequence of panes, and the identification rules pane may appear before the reconciliation pane in the sequence of panes. The method may further include receiving, by the server device by way of the graphical user interface, a definition of a new class of configuration item that uniquely identifies configuration items of a particular type. The method may also include storing, in a database disposed within the remote network management platform that contains representations of configuration items associated with the managed network, the definition of the new class of configuration item.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6C depicts a configuration item class attributes pane of a graphical user interface, in accordance with example embodiments.

FIG. 7 is a flow chart, in accordance with example embodiments.

DETAILED DESCRIPTION

Figure 1:
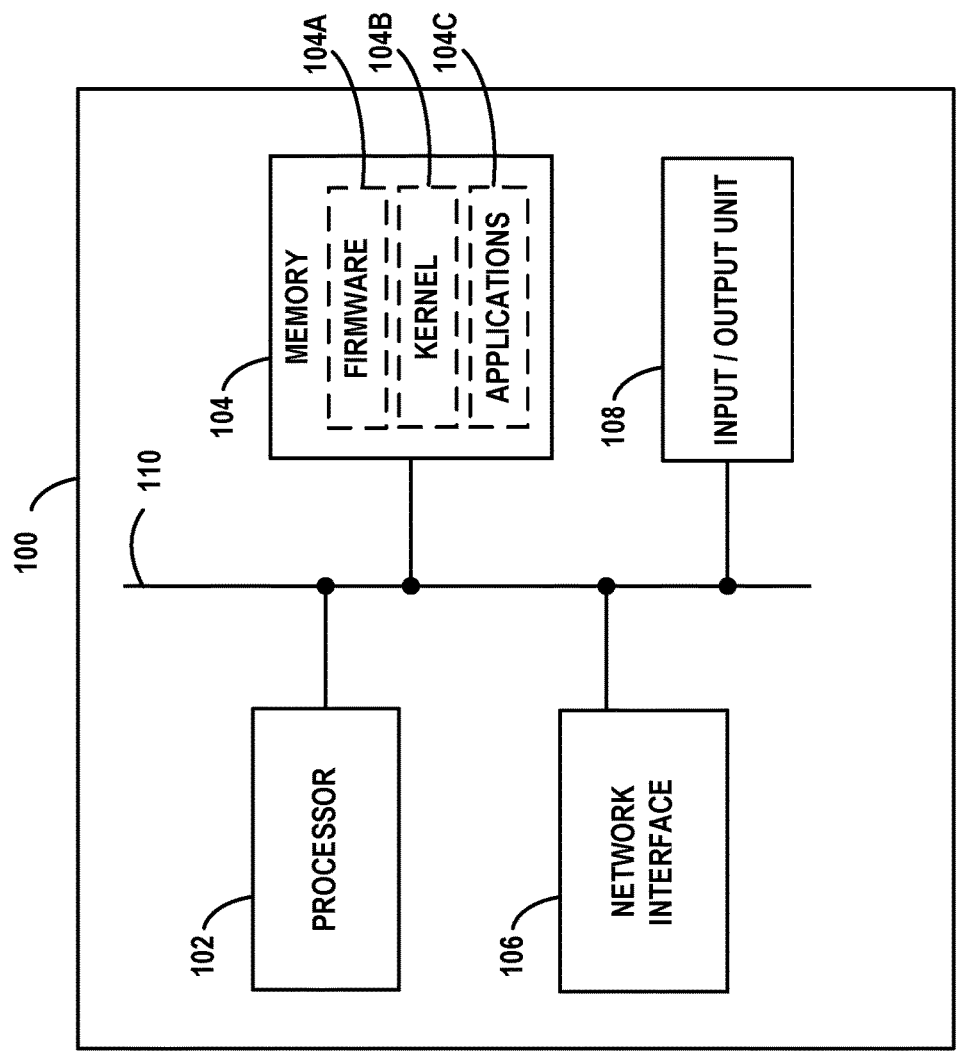
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software applications, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
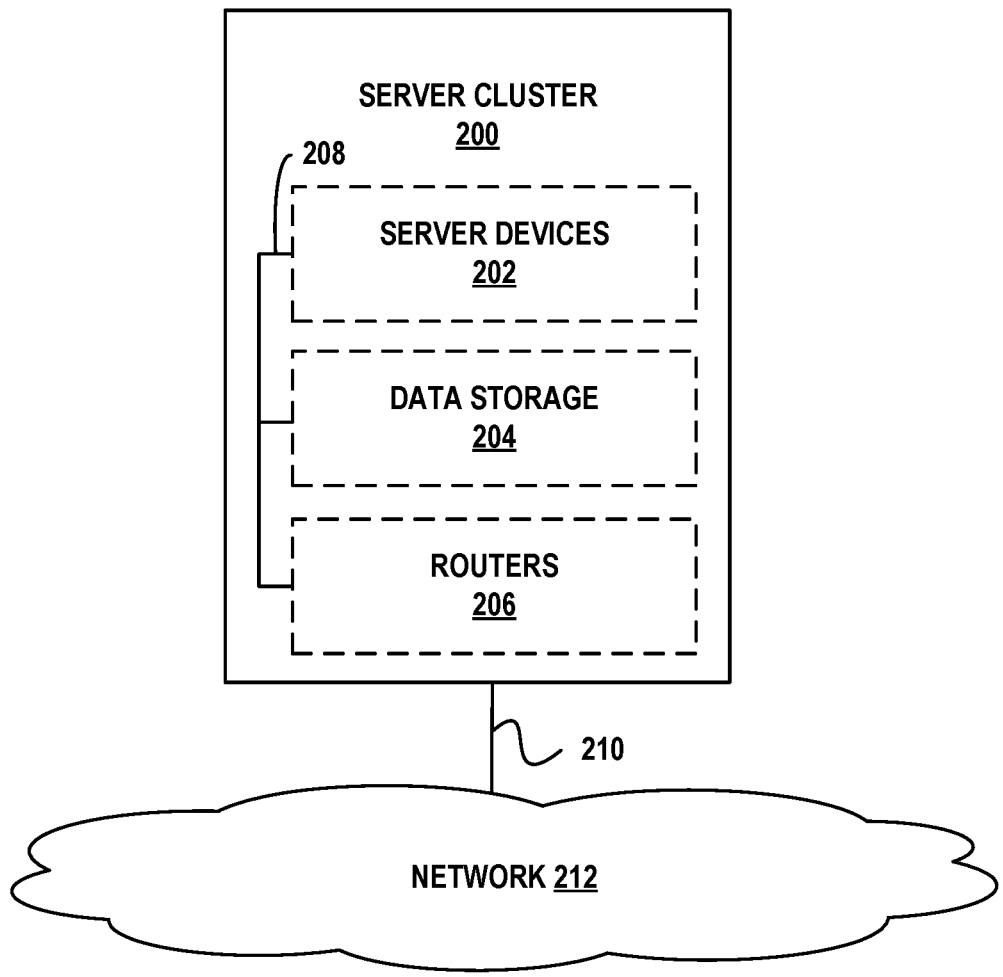
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
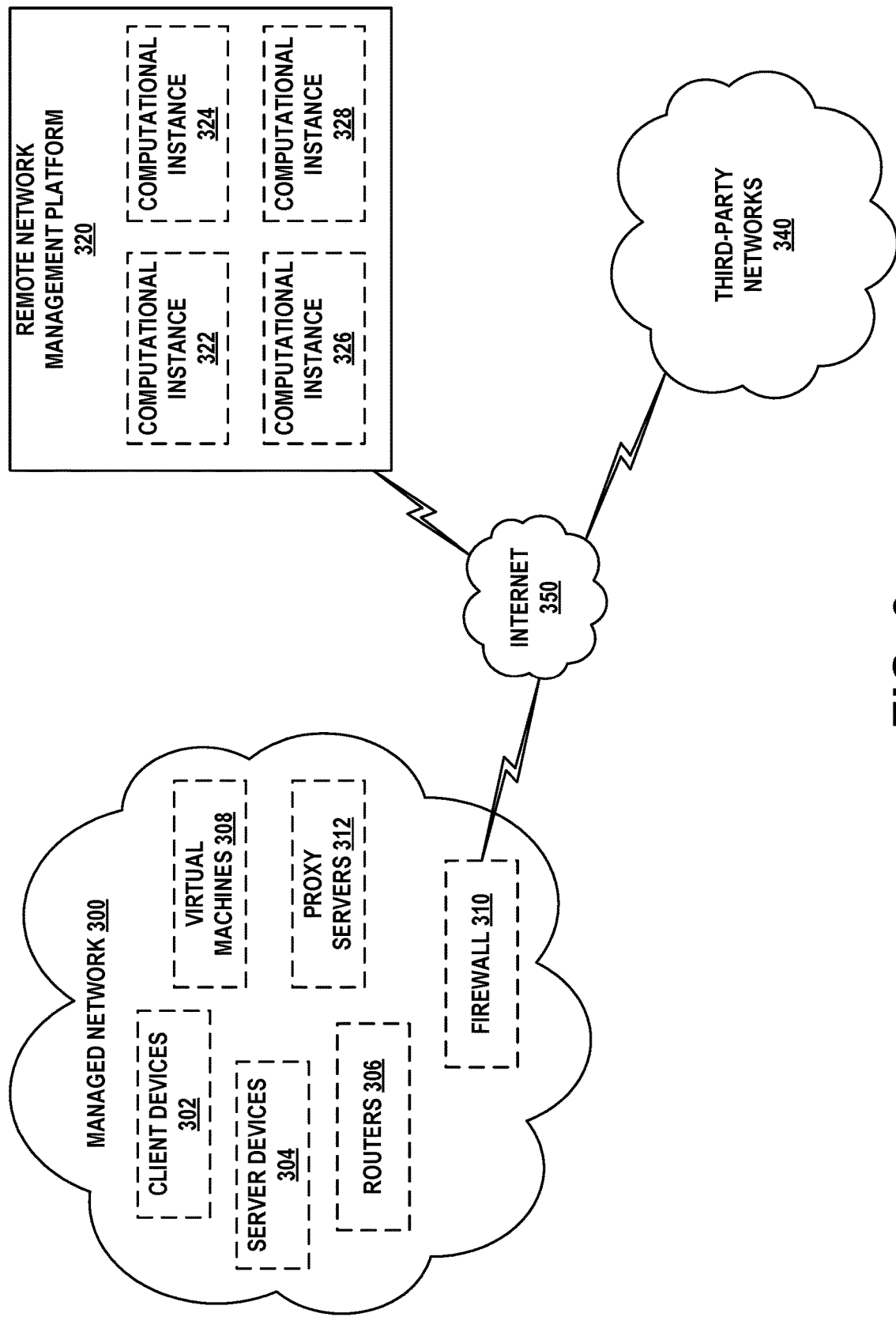
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
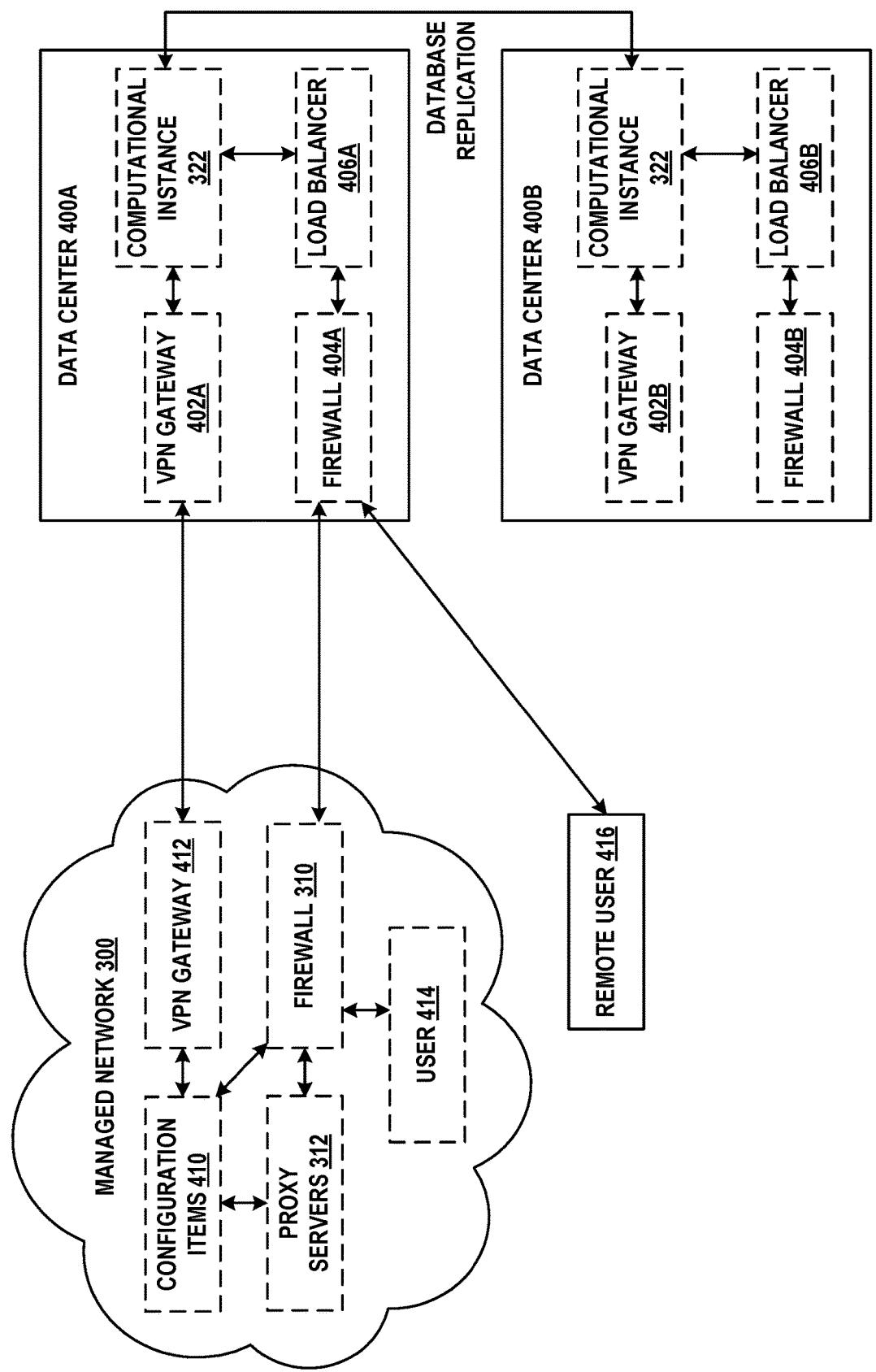
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
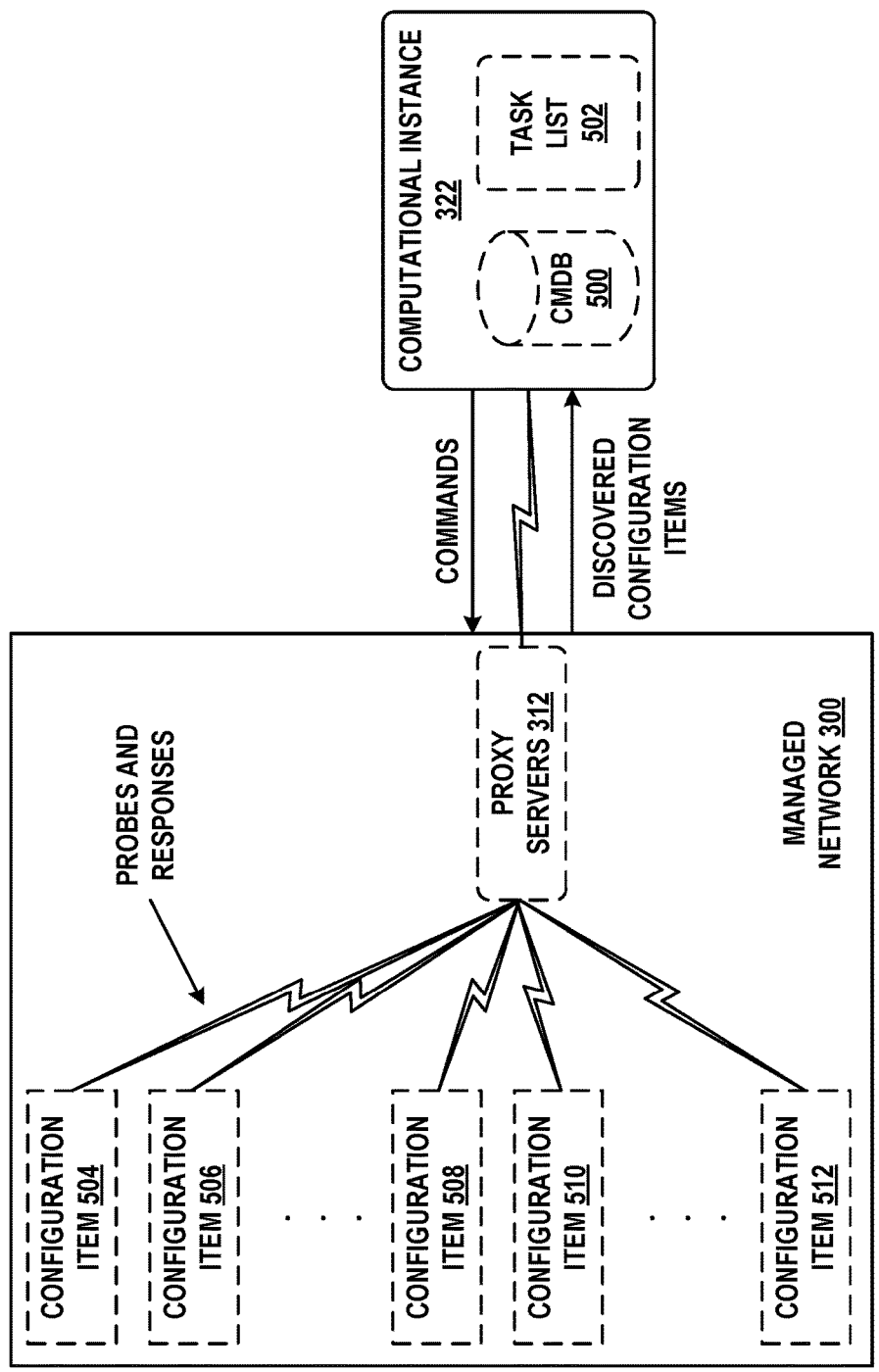
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
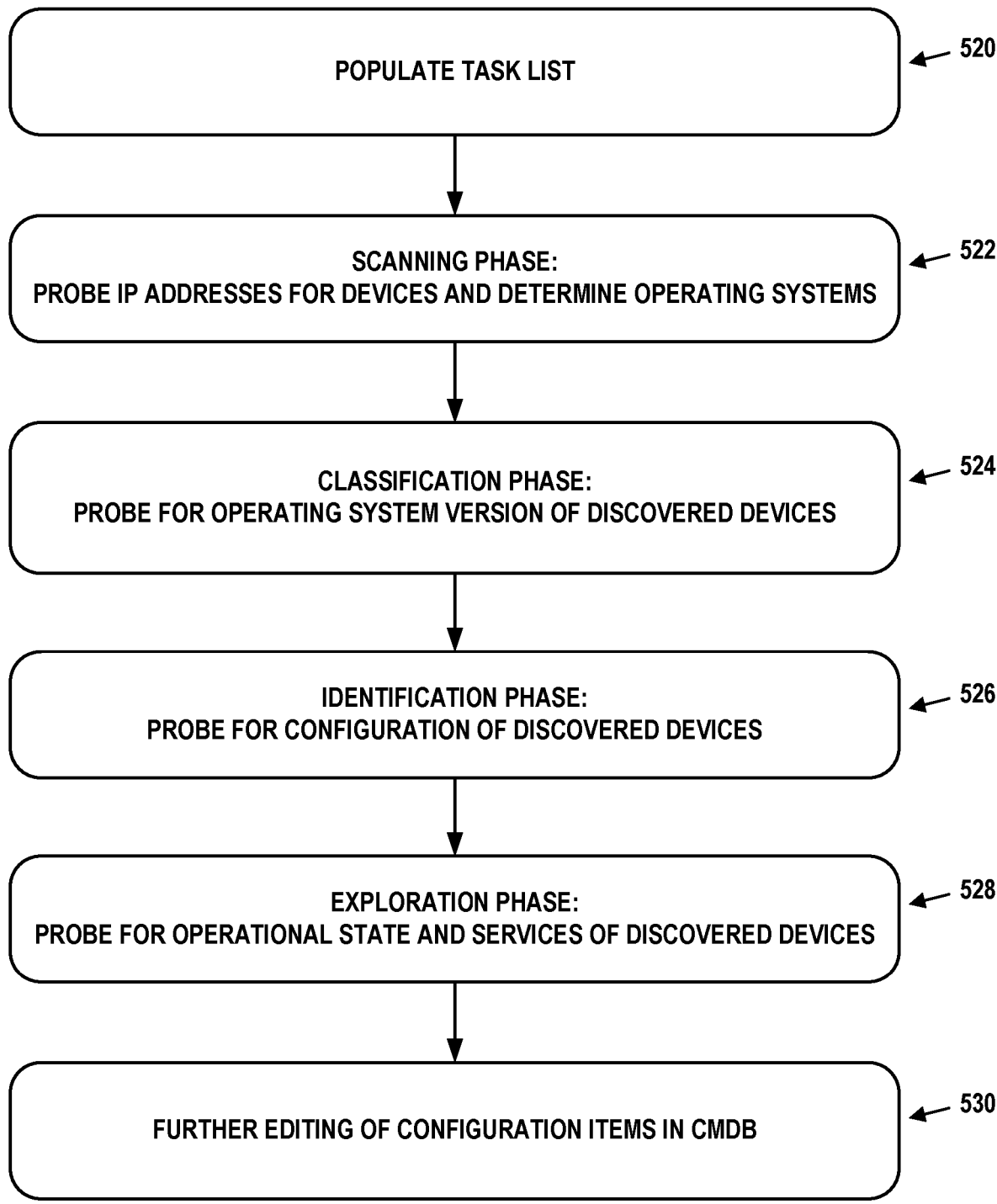
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned priorities that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Example Configuration Item Class Management System

As described above, an identification and reconciliation API may allow for configuration item entries to be vetted prior to storing them in the CMDB by using identification rules and reconciliation rules. Such identification rules and reconciliation rules may belong to a configuration item class. A class of configuration items is a grouping of configuration items that share the same or similar attributes. Identification rules and reconciliation rules, if set properly when a new class of configuration item is created, may prevent overwritten or duplicate configuration item entries, and thus allow the CMDB to store an accurate representation of the configuration items that belong to the new class. Example embodiments are provided below that describe systems and methods for creating a new class of configuration item according to a specific procedure that reduces the likelihood of configuration items of the class being improperly overwritten or duplicated.

To create the new class of configuration item, a user may access a software application associated with the remote network management platform. The application may provide a GUI that allows the user to manage aspects of the enterprise, and may include multiple menus that allow the user to navigate within the application. A user may use one such menu to navigate to a configuration item class manager within the GUI, and navigate therein to a hierarchy of configuration item classes. The hierarchy organizes the configuration item classes, and allows a user to create a new class that belongs to a particular subset of the hierarchy. It should be understand that the hierarchy may, in a general sense, represent classes of configuration items stored in the CMDB. For example, the CMDB itself may be a class of configuration item that every other class of configuration item falls under. In turn, large classes such as "Accessory," "Application," "Cluster," "Data Center," etc. may each include smaller classes within, yet smaller classes may fall under those, and so on. So, a user can create a new class of configuration item at any level of generality or specificity. The selected level of the hierarchy may affect what options are presented to the user via the GUI when creating the new class of configuration item.

Once an input is received that indicates a new class of configuration item is to be created, a sequence of panes may be presented to the user via the GUI. The sequence of panes guides the user through a series of steps. The sequence of panes may each include data entry fields that receive data from a client device controlled by the user, and provide targeted selection choices based on the received data. The GUI may also selectively restrict input options or automatically present default inputs to allow for creation of effective identification and reconciliation rules. The inputs received at each pane of the sequence of panes may be used to collectively define the new class of configuration item. To ensure that the new class of configuration item is created properly, a server device association with the CMDB might not store the definition into the CMDB until each pane of the sequence of panes has received certain required inputs. For instance, storing the definition of the new class of configuration item within the CMDB may be predicated on receiving an indication of at least one identification rule.

The sequence of panes may include an identifier pane that receives information sufficient to create an identifier for the new class of configuration item. For instance, the identifier pane may include a data entry field that receives a name of the new class of configuration item. The sequence may also include an attributes pane that displays each attribute that can be selected when creating an identification rule for the new class of configuration item. The attributes pane may allow a user to input new attributes that are uniquely associated with the new class of configuration item. The sequence may also include an identification rules pane that allows the user to select a set of attributes that will uniquely identify configuration items that belong to the new class of configuration item. The sequence may also include a dependencies pane that allows a user to specify specific relationships between the new class of configuration item and other configuration items within the managed network. For instance, as described below with regard to FIG. 6E, the dependencies pane may allow a user to specify that a type of application is hosted on a particular type of server. Additionally, the sequence of panes may include a reconciliation rules pane that allows the user to specify authoritative devices that can overwrite data pertaining to the configuration item of the new class. By leading a user through this series of panes that receive and display particularized information, the GUI may enforce creation of classes of configuration items that effectuate accurate, consistent, and up to date configuration item entries in the CMDB. In this fashion, problems related to overwriting and duplicating configuration items are mitigated.

Figure 6A:
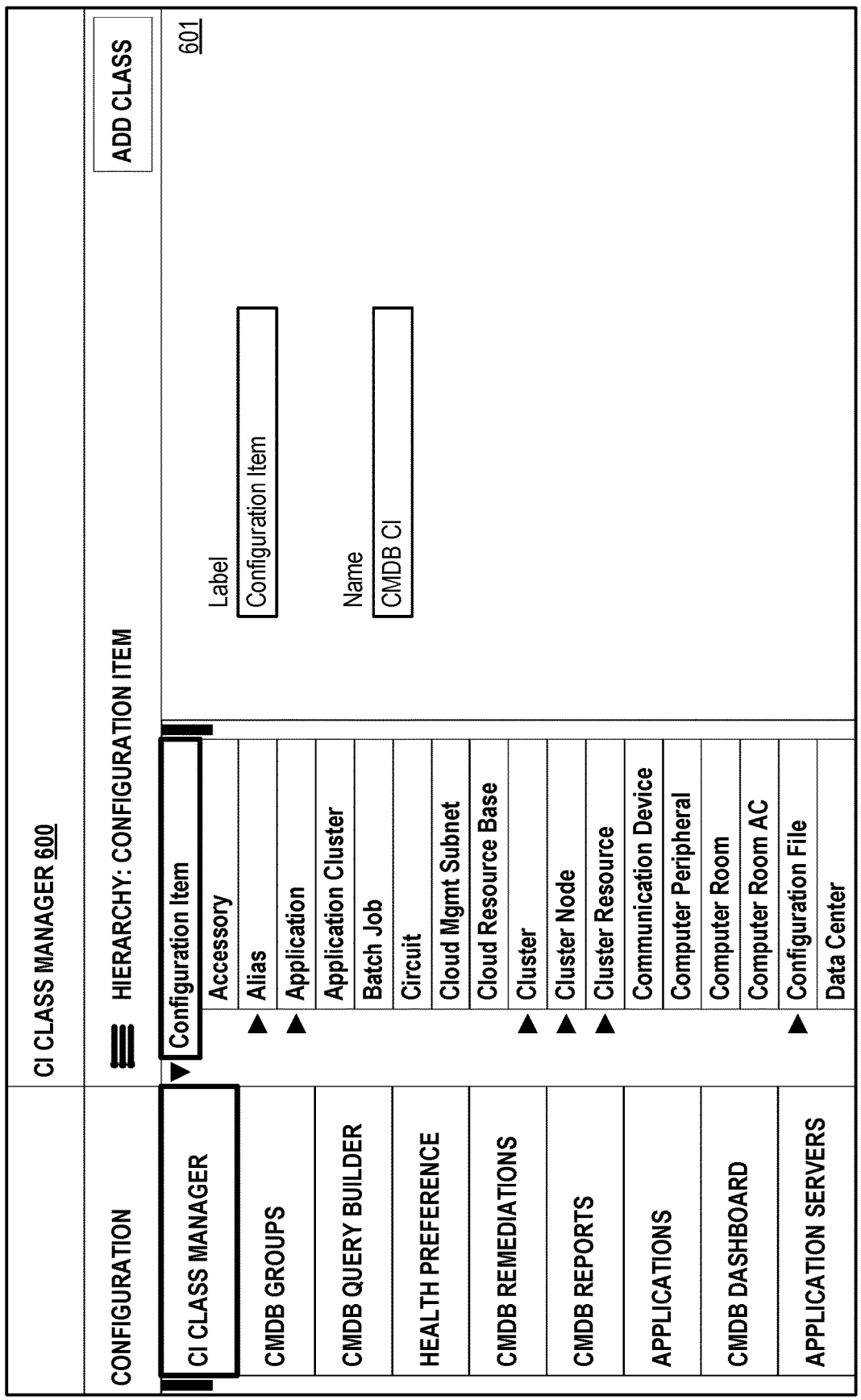
FIG. 6A depicts a graphical user interface, in accordance with example embodiments.

FIG. 6A depicts a graphical user interface that displays a configuration item class manager 600, in accordance with example embodiments. The configuration item class manager may be used to create and manage classes of configuration items to be stored in the CMDB. Configuration item class manager 600 may be selectable from a menu of the graphical user interface, whereupon a hierarchy of classes of configuration items becomes available for selection. In the present example, a hierarchy selection pane 601 includes a scrollable list of general classes in the hierarchy. A user may select from these levels and extend that level of the hierarchy to include the new class of configuration item. In the present example, "configuration item" is selected, which indicates that the new class of configuration item is to belong to the CMDB. If another hierarchy level, such as "Alias" or "Cluster" is selected, then the new class will be considered to be part of the selected hierarchy level.

Once a hierarchy level has been selected, a selectable option to create a new class, such as the "add class" button depicted in FIG. 6A, may be selected. A server device associated with the remote network management platform may receive the indication by way of a client device on which the GUI presented and send a representation of a first of the sequence of panes for display in the GUI. The representation may be based on which level of the hierarchy is selected in configuration item class manager 600.

Figure 6B:
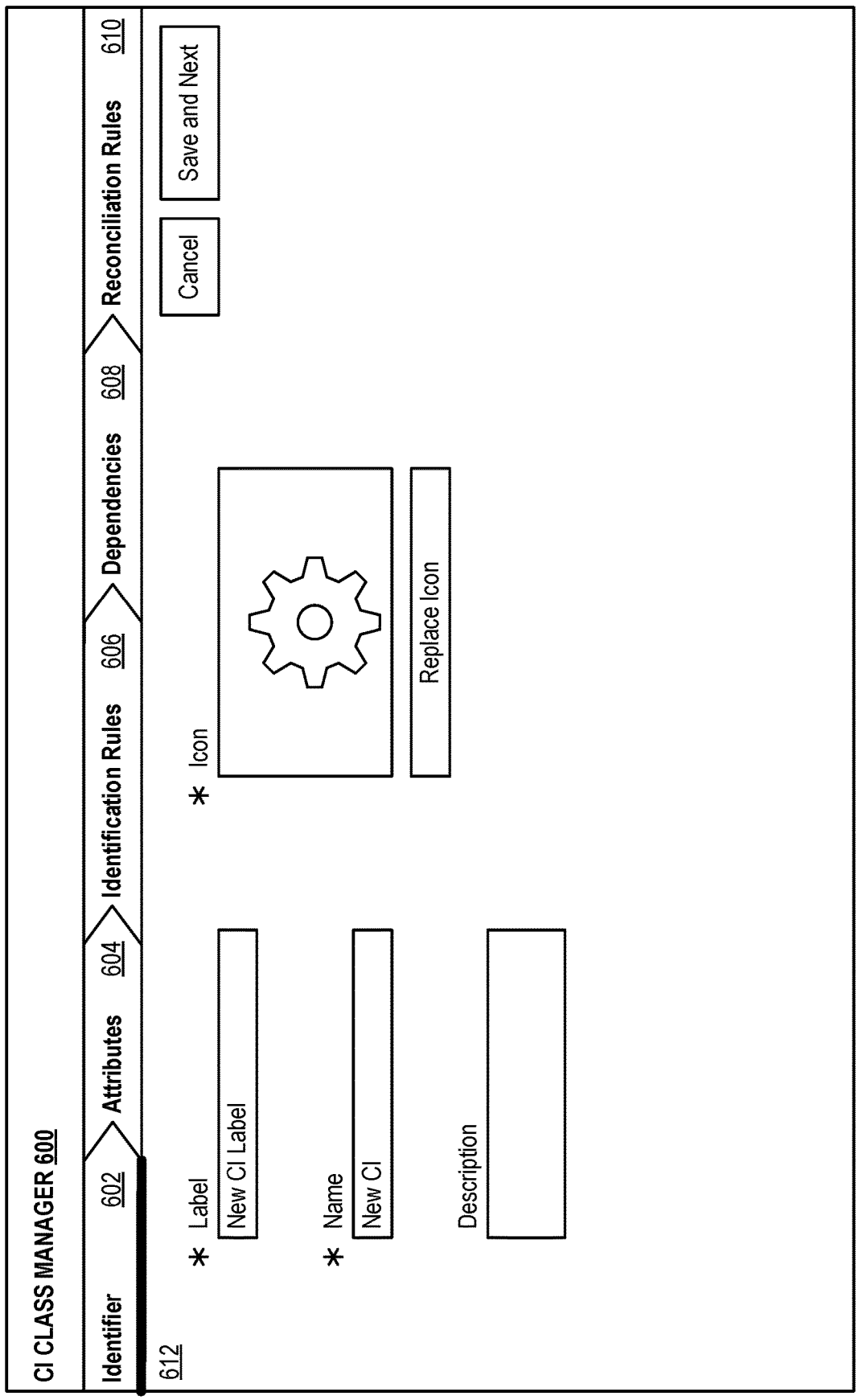
FIG. 6B depicts a configuration item class identifier pane of a graphical user interface, in accordance with example embodiments.

FIG. 6B depicts a configuration item class manager 600 having a configuration item class identifier pane 602 of a graphical user interface, in accordance with example embodiments. Identifier pane 602 may be operable to set an identifier for the new class of configuration item. This identifier may be used as a reference when organizing the CMDB. For instance, the new class of configuration item may take the form of an object within a data structure that represents configuration item entries. Inputs received in data entry fields of identifier pane 602 may be parameters of the object.

Identifier pane 602 may include a labelling pane 612 that includes the one or more data entry fields. In the present example, labelling pane 612 allows for specification of a configuration item "label," "name," "description," and "icon." Any one of the data entry fields in labelling pane 612, or any combination of the data entry fields, may be used to specify an identifier for the new class of configuration item.

The "label," field may provide a nickname for the new class, and the "name" field may provide a full name for the new class. For instance, where the new class is a software application, the "label" field may simply provide the name of the software application, whereas the "name" field may include a more specific identification, such as a version number. The "description" field may include additional details of the new class.

The "icon" field may be a selectable field that places the new class in a generic category. For instance, the "icon" field may specify that the new class is an accessory, an active directory, an application server, an application, a cloud clone, a cluster, a computer, a computer room, a data center, a database, a disk, an e-mail server, a generator, an HVAC, a fueltank, a network, a load balancer, a NAT, a network device, a network socket, or the like. Thus, the "icon" field may allow for very broad or very narrow classes of configuration item, as the case may be. The "icon" option may be tied to common levels of the hierarchy described above, such that a user may effectively set a parent class for the new class of configuration item based on the selected icon. In the present example, a general icon may be selected that designates that the new class belongs to the CMDB, but the icon could be updated to signify that the new class is an application, computer, data center, etc.

In the present example, the "label" field specifies that the new class of configuration item as "New CI Label," the "name" field specifies the new class as "New CI," the "description" field is blank, and the "icon," field shows a generic icon. In FIG. 6B, fields with an associated asterisk may be mandatory, while fields without an associated asterisk are optional.

In labelling pane 612, the "label," "name," and "icon" fields may require data inputs before pane 604, 606, 608, or 610 can receive data. Such restrictions may ensure that an identifier is complete, or that the new class does not replicate a class of configuration item that already exists. Labelling pane 612 may also include selectable options to proceed (denoted in the present example as "save and next") or to stop creation of the new configuration item (denoted in the present example as "cancel").

FIG. 6C depicts a configuration item class attributes pane 604 of configuration item class manager 600, in accordance with example embodiments. The attributes specified in class attributes pane 604 may form a set of attributes from which identification rules of the new class of configuration item can be defined.

Class attributes pane 604 may include data entry fields that specify attributes for potential association with the new class of configuration item. For instance, a toggle view pane 614 may allow for selection of an "added" view that shows new attributes that can be used to uniquely identify configuration items that belong to the new class of configuration item, a "derived" view that shows attributes used to uniquely identify configuration items that belong to the parent class, and an "all" view that shows all attributes that can be used to uniquely identify configuration items that belong to the new class. Toggle view pane 614 may also include a caption that describes the purpose of each view. For instance, in the present example the "added" view is selected, and a caption appears in toggle view pane 614 that reads "criterion attributes that uniquely identify the CI which are created specifically for the CI class." Other captions may appear when the "derived" or "all" views are selected.

A column label pane 616 may show a list of each attribute that can be used to identify configuration items that belong to the new class of configuration item. In the present example, a single new attribute is being added to the list, which reads "New CI Label." The list may also specify additional details of each attribute. As described above, attributes may uniquely identify particular configuration items that belong to a defined class of configuration item. For instance, attributes associated with a particular type of computing device may include a name, operating system version, memory size, disk space, CPU type, or the like. Different attributes may be appropriate for different types of classes of configuration item, and so different attributes may appear based on which hierarchy level is selected in the configuration item class manager 600 depicted in FIG. 6A or in the "icon" option depicted in FIG. 6B.

It should be understood that the hierarchy described above with regard to FIG. 6A may be set based on the attributes associated with each class of configuration item. For instance, servers may have different attributes from computers, which include workstations and laptops, and so servers and computers might not be represented at the same level in the hierarchy. Further, Linux servers and UNIX servers may have different attributes from the parent server classification and from each other, so they occupy separate branches in the hierarchy. A parent classification may refer to a class of configuration item associated with a first set of attributes, and may contain child classes within it that are associated with a second set of attributes that contains each attribute of the first set along with additional attributes. For instance, in the present example, adding the new attribute in the "added" view may determine where the new class is disposed within the hierarchy.

Figure 6D:
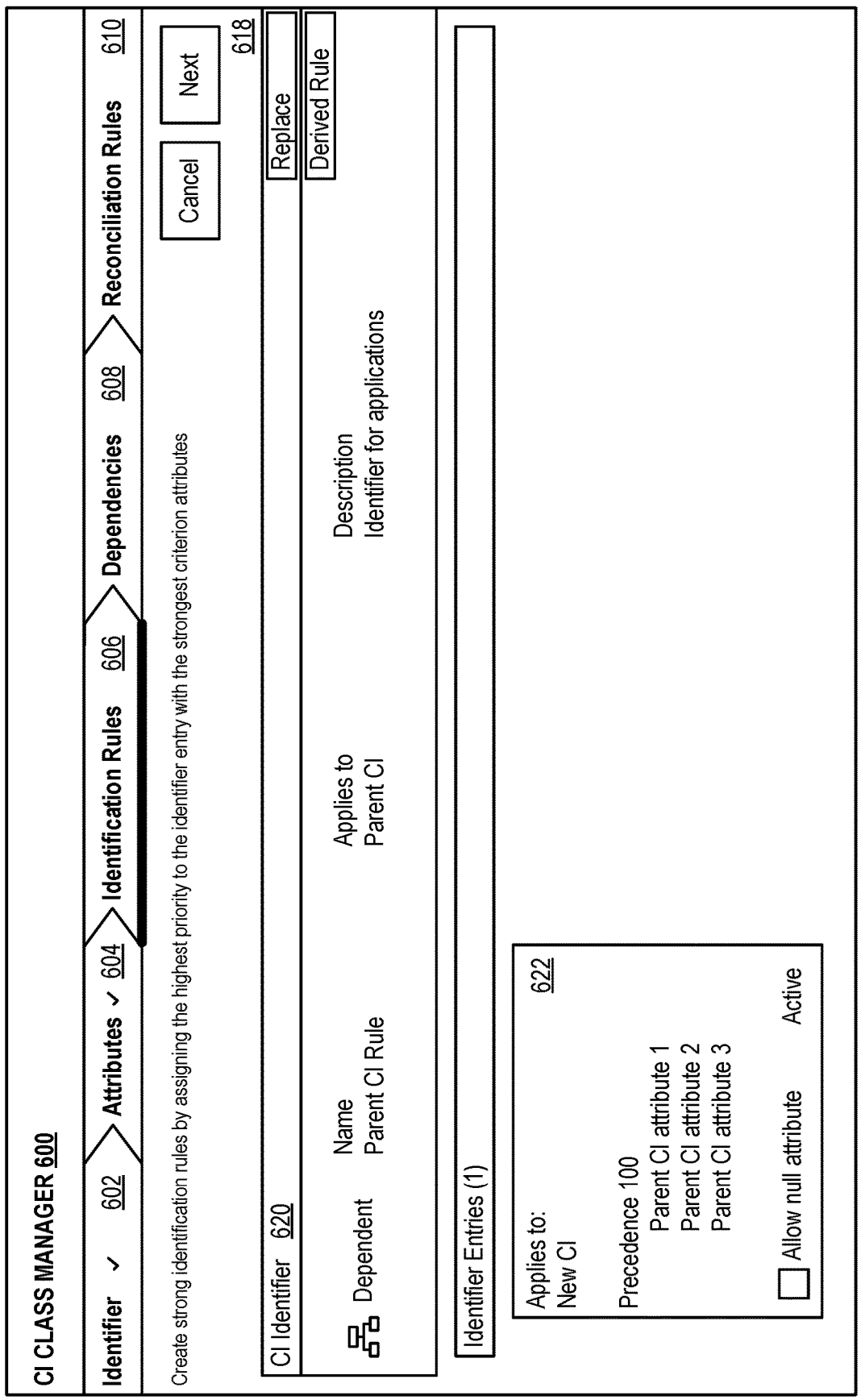
FIG. 6D depicts a configuration item class identification rules pane of a graphical user interface, in accordance with example embodiments.

FIG. 6D depicts a configuration item class identification rules pane 606 of configuration item class manager 600, in accordance with example embodiments. Identification rules specified in identification rules pane 606 may allow for unique identification of configuration items that belong to the new class of configuration item.

In the present example, identification rules pane 606 includes a caption pane 618, configuration item identifier pane 620 and a identifier entry pane 622. Caption pane 618 may include a caption that guides selection of attributes in setting an identification rule for the new class of configuration item. Configuration item identifier pane 620 may include a selectable option to set an identifier entry associated with the new class of configuration item.

In the present example, the new class of configuration item is associated with a parent class of configuration item. Accordingly, the new class of configuration item has an identification rule that derives from the parent class. Thus, configuration item identifier pane 620 specifies that the identification rule is "dependent," that the name of the identification rule is "Parent CI Rule," and that the rule applies to "Parent CI." Configuration item identifier pane 620 additionally includes an option to "replace" the rule with one that specifically applies to the new class of configuration item. A "derived rule" button allows for a user to optionally apply rule derived from the parent class to the new class of configuration item.

Identifier entries pane 622 depicts each identification rule associated with the new class of configuration item. In the present example, the "derived rule" option is selected, and so identifier entries pane 622 specifies that the entry applies to "New CI." Pane 622 also specifies the specific attributes associated with the rule ("Parent CI attribute 1," "Parent CI attribute 2," and "Parent CI attribute 3"). Additionally, pane 622 specifies a precedence of the rule ("100"). Though only one rule is specified in the present example, it is possible that two or more identification rules may be specified for uniquely identifying configuration items that belong to the new class of configuration item. In examples where there is more than one identification rule, the "precedence" of the rule may determine which rule is used to identify configuration items. For instance, rules with higher precedences may take priority over rules with lower precedences.

In examples where the "replace" option is selected, or where the new class is not associated with a parent class of configuration item, identification rule pane 606 may provide selectable attributes used to define the identification rule associated with the new class of configuration item. Though not depicted in FIG. 6D, upon receiving an indication that a new identification rule is to be defined in pane 606, the server device may provide a pane that includes the selectable attributes. The selectable attributes may be provided based on how germane they are to the new class. For instance, where the new class is a child class, the selectable attributes may include attributes associated specifically with the parent class. It should be understood that a child class may include different attributes than those associated with a parent class. In other examples, the selectable attributes may be determined based on the icon selected at class identifier pane 602. In still other examples, the selectable attributes may be determined based on which attributes were added in configuration item class attributes pane 604. Other ways of determining which attributes are possible as well.

In some examples, defining the new class of configuration item may be based primarily on data received by way of identification rule pane 606. For instance, the definition may simply include an identifier associated with the new class specified in identifier pane 602 and the attributes specified in the identification rule. In the present example, the definition may simply include an identifier of "New CI" and the attributes listed in identifier entries pane 622 ("Parent CI attribute 1," "Parent CI attribute 2," and "Parent CI attribute 3"). Because the definition of the new class of configuration item might rely primarily on the identification rule, access to panes 608 and 610 may be restricted until an identification rule is entered for the new class. In such examples, an option to proceed with creation of the new class (for example, the selectable "next" button in caption pane 618) may not be selectable until the identification rule is defined and saved to the server device.

Figure 6E:
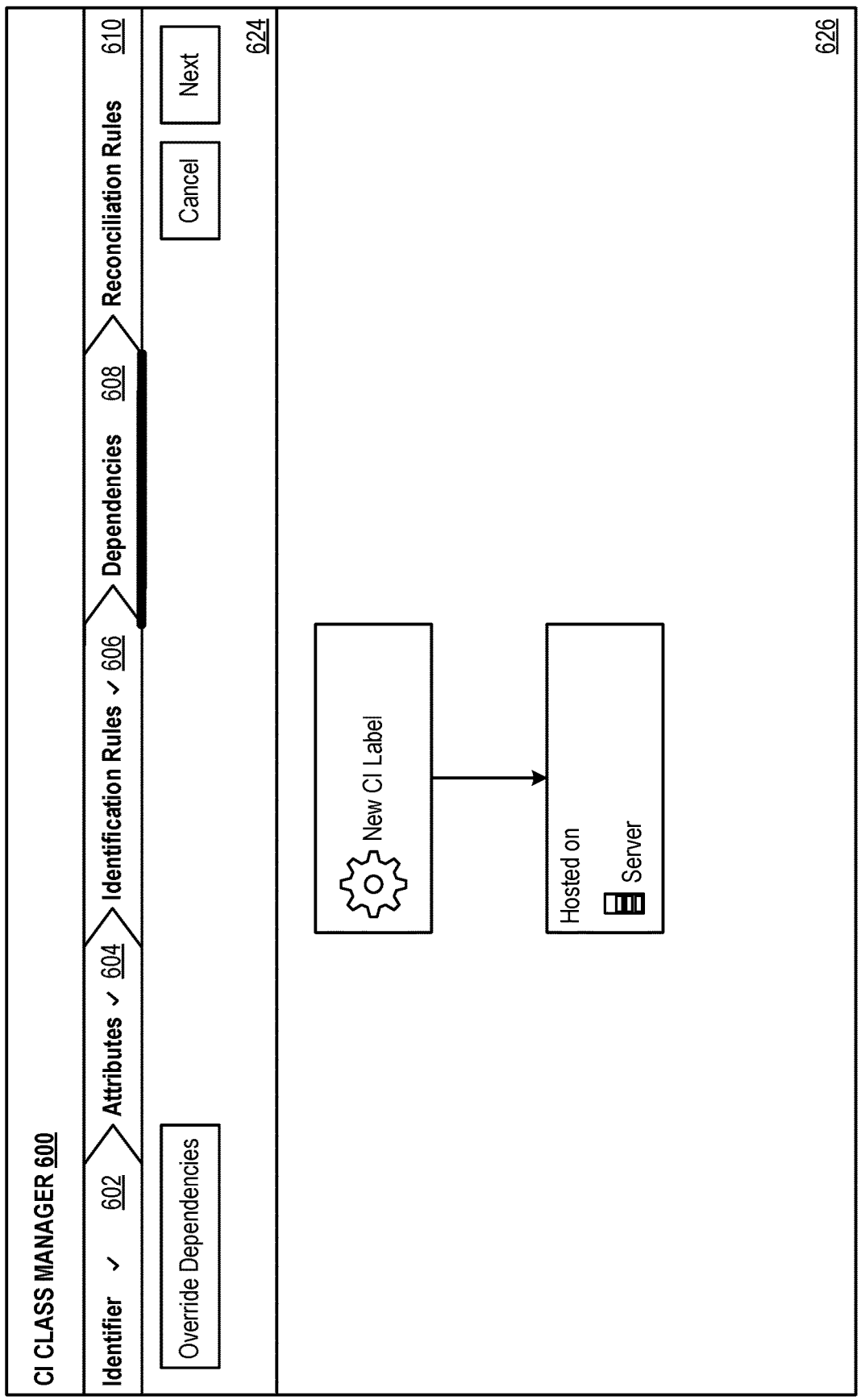
FIG. 6E depicts a configuration item class dependencies pane of a graphical user interface, in accordance with example embodiments.

FIG. 6E depicts a configuration item class dependencies pane 608 of the configuration item class manager 600, in accordance with example embodiments. Class dependencies pane 608 may serve to specify relationships between the new class of configuration item and other classes of configuration item stored within the CMDB. Specification of these relationships may allow for more targeted discovery of configuration items in the managed network.

Class dependencies pane 608 may include an override dependencies pane 624 and a dependencies view pane 626. The override dependencies pane may allow for selection of specific relationships to the new class of configuration item.

In the present example dependencies view pane 626 portrays the new class as being hosted on a "Server" class of configuration item. This dependency may be derived from a parent class. For instance, the new class of configuration item may be an application, and the application classification may have a set dependency specifying that applications are hosted by the server classification. However, this dependency may be overridden to provide more specific details of the dependency. For instance, the new class of configuration item may be specifically hosted by Linux servers, and so the dependency can be overridden to specify as much. Such details may allow for more targeted discovery of configuration items that allows for discovery to be performed more efficiently. Such specific dependencies may also contribute to defining the new class of configuration item.

As described above with regard to panes 602, 604, and 606, configuration item class dependencies pane 608 may include an option to proceed with definition of the new class (for example, the selectable "next" button in override dependencies pane 624). Though dependencies of the new class may be specified in configuration item dependencies pane 608, and may contribute to a definition of the new class, in some examples no dependencies are specified in pane 608. Thus, in some examples, the option to proceed in pane 624 may be selectable regardless of whether a dependency is specified.

Figure 6F:
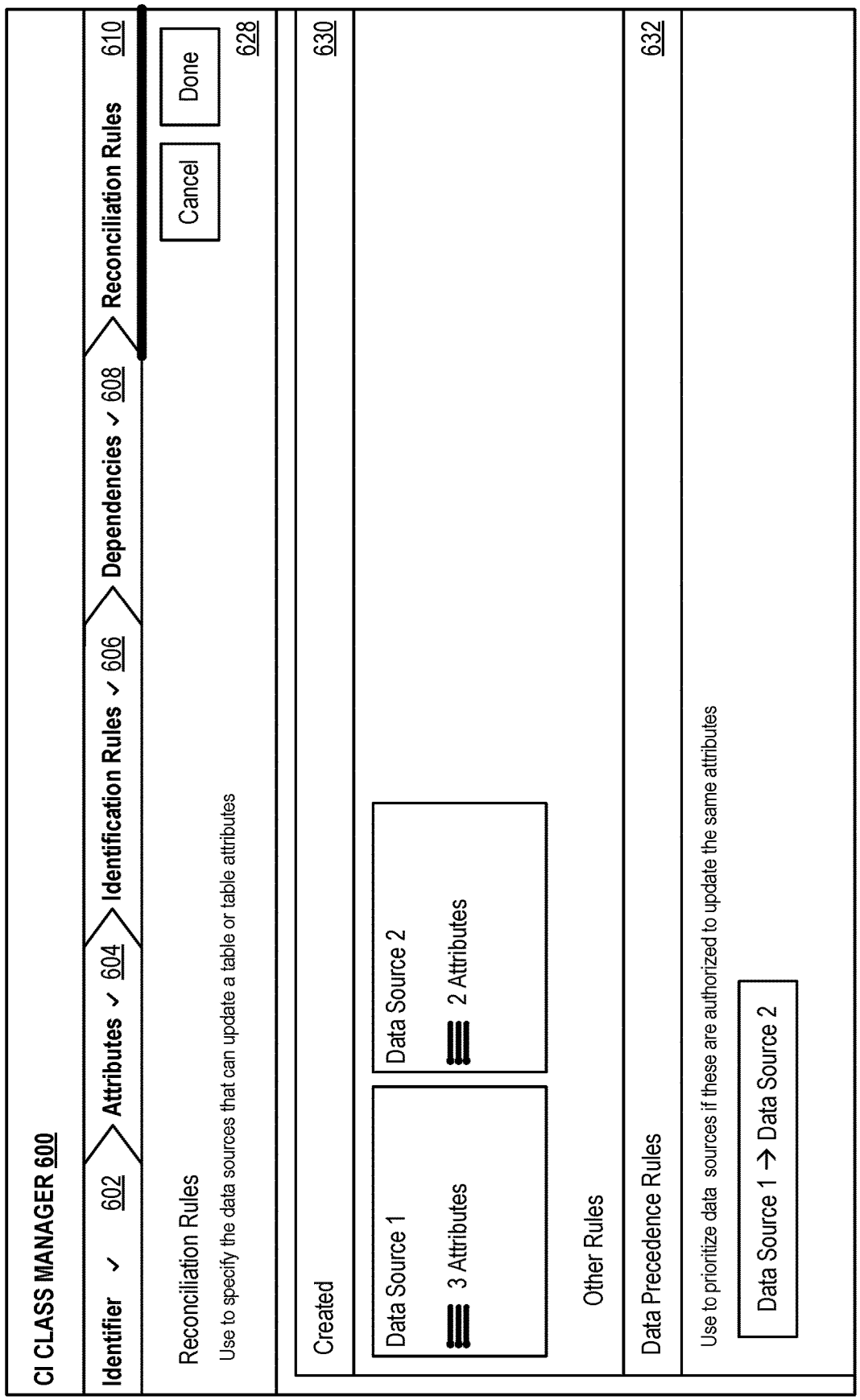
FIG. 6F depicts a configuration item class reconciliation rules pane of a graphical user interface, in accordance with example embodiments.

FIG. 6F depicts a configuration item class reconciliation rules pane 610 of a configuration item class manager 600, in accordance with example embodiments. Reconciliation rules pane 610 may be used to specify authoritative devices that can modify attributes of the new class of configuration item.

The configuration item class reconciliation rules pane 610 may include a caption pane 628, a created rules pane 630, and a data priority rules pane 632. Reconciliation rules may specify authoritative data sources associated with the managed network and/or the remote network management platform than can be used to modify attributes of the new class of configuration item. For instance, a particular data source may be able to write to some, but not all, attributes of the new class.

Though not depicted in FIG. 6F, configuration item class reconciliation rules pane 610 may include a selectable pane that allows for particular data sources to be specified that can modify attributes of the new class. These attributes may include those specified in identification rule pane 606, though other attributes can be specified as well. The data sources may be particular computing devices or software applications associated with the managed network and/or the remote network management platform.

In the present example, two data sources have been specified, as depicted in created rules pane 630. Though not shown in FIG. 6F, Data Source 1 is authorized to modify three attributes associated with the new class of configuration item and Data Source 2 is authorized to modify two attributes associated with the new class. Further, in the present example, at least one of the attributes is modifiable by both Data Source 1 and Data Source 2. Thus, data priority rules pane 632 allows for specification of which data source has priority in modifying the common attribute. In the present example, Data Source 1 has priority over Data Source 2. Thus, if Data Source 1 has written to the common attribute, Data Source 2 is unable to modify that attribute. Conversely, if Data Source 2 has previously modified the common attribute, Data Source 1 is still able to modify that attribute.

As described above with regard to panes 602, 604, 606, and 608, configuration item class reconciliation rules pane 610 includes a selectable option to proceed with definition of the new class. In caption pane 628, a selectable "done" button allows for the new class of configuration item to be set by the server device disposed within the remote network management platform.

In each of FIGS. 6B, 6C, 6D, 6E, and 6F, panes 602, 604, 606, 608, and 610 include a selectable option to proceed (denoted by, for example, a "next" button) or to stop creating the new class of configuration item (denoted by, for example, a "cancel" button). In some examples, access to one of panes 604, 606, 608, or 610 may be restricted based on whether data was received from data entry fields in previous panes of the sequence of panes. As described above with regard to FIG. 6C, ultimate creation of the new class of configuration item may be predicated on some panes in the sequence in particular. For instance, in some examples, the server device may define the new class of configuration item only after receiving data from a data entry field of identification rule pane 606. In other examples, the new class of configuration item may be defined only after pane 602, pane 606, and pane 610 have received data from a data entry field. Other ways of defining the new class of configuration item are possible as well.

As a result of defining the new class of configuration item as described above with regard to FIGS. 6A, 6B, 6C, 6D, 6E, and 6F the sever device may cause the CMDB to store the definition of the new class of configuration item. Discovery of configuration items that belong to the new class may be performed at any point upon selection of a discovery option within a GUI provided by the server device to a client device. However, discovery of the configuration items may also be performed automatically once the new class has been defined.

VII. Example Scenario for Creating a New Class of Configuration Item

In an example scenario, a user may wish to create a new class of configuration item that represents a newly acquired software application. A license to use the newly acquired software application may specify that the software application can be installed on a specified number of computing devices. So, the user may wish to create the new class of configuration item to facilitate discovery of the newly acquired software application and to determine whether the enterprise is in compliance with the license.

The user may access the GUI having a configuration item class manager as described above with regard to FIG. 6A. The user may select the "application" option depicted in hierarchy selection pane 601, and select the "add class" button. In doing so, the user may cause the client device to send an indication to a server device associated with a remote network management platform that a new class of configuration item is to be created, and that the new class is a software application. The new class may thus be considered a child class of an application class stored in a CMDB.

Responsive to receiving the indication from the client device, the server device may provide, for display on the client device, a sequence of panes. An identifier pane, such as that described above with regard to FIG. 6B may allow the user to specify the name of the software application, and to select an icon. Because, in the example scenario, the user selected "application" in hierarchy selection pane 601, the server device may automatically set the icon as an application icon. After selecting "save and next" in labelling pane 612, the user may be presented with class attributes pane 604 as depicted in FIG. 6C.

Class attributes pane 604 may show each attribute associated with the parent application class, and may allow the user to specify one or more attributes unique to the newly acquired application. The user may specify a naming attribute that limits the class to software application configuration items that contain a specific string. For the purposes of the example scenario, the application is assumed to be called "New CI," and so the specific string may include that name. After selecting "next" in toggle view pane 614, the user may be presented with identification rules pane 606 as depicted in FIG. 6D.

Identification rules pane 606 may automatically present one or more identification rules associated with the parent application class. The user may opt to replace the existing rules derived from the parent class with ones that more specifically target the newly acquired software application. For instance, the user may click the "replace" option in configuration item identifier pane 620, and, upon receiving a data entry option from the GUI, specify the naming attribute added in class attributes pane 604 in addition to the attributes derived from the parent class. The user may choose to keep one or more rules from the parent class, and set the precedence to use those rules before using the newly set identification rule. So, in the example scenario, the identifier entries pane 622 may include one or more rules derived from the parent class (set at precedence level "100"), along with the newly added rule that includes the newly added attribute from class attributes pane 604 (set at precedence level "200"). After selecting "next" in caption pane 618, the user may be presented with dependencies pane 608 as depicted in FIG. 6E.

Dependencies pane 608 may automatically present, to the user, the dependencies of the parent application class. So, as depicted in FIG. 6E, the presented dependency may show that the new class of configuration item is hosted on the "servers" class of configuration item. In the present example, the "New CI" application software may be exclusively hosted on UNIX servers, so the user may select "override dependencies," receive an option to select a different dependency from the server device, and specify that "New CI" is hosted on the UNIX server class of configuration item. The dependency might allow for quicker and more accurate discovery of configuration items that belong to the new class of configuration item. After selecting "next" in override dependencies pane 624, the user may be presented with reconciliation rules pane 610 as depicted in FIG. 6F.

Reconciliation rules pane 610 may automatically present, to the user, the reconciliation rules of the parent application class. The user may be satisfied with the data sources specified in created rules pane 630, but may wish to update one of the rules to include the newly added attribute specified in class attributes pane 604 so that one or more the authoritative data sources can update the attribute. The server device may cause the GUI to present an option to select different attributes in the rule. After selecting "done" in caption pane 628, the new class of configuration item may be properly defined, and the server device may cause the CMDB to store a representation of the definition of the new class of configuration item.

The definition may include all of, or some of, the information received by various data entry fields of configuration item class manager 600, and specifically at panes 602, 604, 606, 608, and 610. In the present example, the definition may include at least a reference to the parent application class, the specified identifier, the newly added attribute, the updated identification rules, the dependency on UNIX servers, and the updated reconciliation rules.

It should be understood that the provided example scenario is one of many such examples, and should not be construed as limiting. For example, any number of types of configuration item classes could be added using similar steps. Further, though a user is described as interacting with each pane of the sequence, some user interactions may be performed automatically, or not at all, while still allowing the new class of configuration item to be created.

VIII. Example Operations

FIG. 7 is a flow chart illustrating an example embodiment. The process illustrated by FIG. 7 may be carried out by the "server device" described above with regard to FIGS. 6A, 6B, 6C, 6D, 6E, and 6F or any computing device associated with a remote network management platform, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 7 may be simplified by the removal of any one or more of the features shown therein. For instance, though configuration item class manager 600 is depicted as including six sequentially-related panes, certain of the panes may be removed or combined in practice. Further, these embodiments may be combined with features, aspects, and/or implementations of any of the previous figures or otherwise described herein.

a. Providing a Sequence of Panes in the Configuration Item Class Manager

Block 700 may be carried out to provide, by a server device disposed within the remote network management platform to a client device associated with a managed network, a GUI including a sequence of panes. The sequence of panes may include two or more panes that facilitate creation of a new class of configuration item. As described above, the configuration items may represent at least computing devices and software applications disposed within the managed network. For instance, configuration items may refer to any or all of client devices 302, server devices 304, routers 306, and virtual machines 308, any applications or services executing thereon, as well as relationships between devices, applications, and services.

An identifier pane of the sequence of panes may include first data entry fields for specification of an identifier of the new class. For instance, the first pane may include labelling pane 612 described above with regard to FIG. 6B.

An identification rules pane of the sequence of panes may include second data entry fields for specification of configuration item attributes that are operable to uniquely identify configuration items of the new class. For instance, the identification rules pane may include selectable attributes described above with regard to FIG. 6D. The second data entry fields may allow specification of a set of configuration item attributes that are operable to uniquely identify configuration items of the new class, and an indication of a precedence level associated with the set of configuration item attributes. In some examples, such as those depicted in FIG. 6D, the new class may be associated with a parent class of configuration item. In such examples, the identification rules pane of the sequence of panes may include indications of parent configuration item attributes associated with the parent class of configuration item. The second data entry fields may allow specification of one or more of the parent configuration item attributes that, in combination with the set of configuration item attributes, are operable to uniquely identify configuration items of the new class.

Allowing specification of the set of configuration item attributes that are operable to uniquely identify configuration items of the new class may include reading, by the server device, from the database, a list of all configuration item attributes associated with the new class. The second data entry fields may allow configuration item attributes in the set of configuration item attributes to be selected from the list.

A reconciliation pane of the sequence of panes may include third data entry fields for specification of authoritative devices that are permitted to modify, within the database, one or more configuration item attributes of configuration items of the new class. For instance, the reconciliation pane may include a data entry field that provides selectable indications of authoritative devices, as describe above with regard to FIG. 6F. The third data entry field pane may include an indication of two or more authoritative devices, such as "Data Source 1" and "Data Source 2" depicted in FIG. 6E. The third data entry field may also include an indication of a relative priority between the two or more authoritative devices.

In some examples, the identifier pane may appear before the identification rules pane in the sequence of panes, and the identification rules pane may appear before the reconciliation pane in the sequence of panes. However, as described above, any sequence or combination of the panes in the GUI may be provided by the server device.

The GUI may further include a hierarchy pane of the sequence of panes, such as that described above with regard to FIG. 6A that allows specification of a parent class of configuration item for the new class. The hierarchy pane may appear before the identifier pane in the sequence of panes.

The GUI may further include an attributes pane, such as that described above with regard to FIG. 6C. The attributes pane may appear between the identifier pane and the identification rules pane. The attributes pane may allow specification of a plurality of configuration item attributes associated with the new class. In some examples, the new class may be associated with a parent class of configuration item. In such examples, the attributes pane may include indications of which configuration item attributes associated with the new class that are derived from the parent class.

The GUI may further include a dependencies pane, such as that depicted above with regard to FIG. 6E. The dependencies pane may be provided between the identification rules pane and the reconciliation rules pane. The dependencies pane may allow specification of an association between the new class and a further class of configuration item defined for the managed network. Configuration items of the new class may depend upon configuration items of the further class in order to operate.

In certain instances, the sequence of panes might be sequentially enforced by the server device such that provision, by the server device, of a subsequent pane of the sequence is performed responsive to receiving data by way of a data entry field that corresponds to a current pane of the sequence.

b. Receiving a Definition of a New Class of Configuration Item

The server device may receive, by way of the GUI, a definition of a new class of configuration item that uniquely identifies configuration items of a particular type. This definition may include data received in any or all of the data entry fields provided in the GUI. For instance, the received definition of the new class of configuration item may include an indication of the identifier of the new class of configuration item received from the first data entry field, and an indication of the attributes that are operable to uniquely identify configuration items of the new class received from the second data entry field. In other instances, the indication may additionally include an indication of the authoritative devices that are permitted to update the database with information related to configuration items of the new class received from the third data entry field. In still other examples, the received indication of the definition may include data received in the fourth data entry field, and/or the fifth data entry field.

c. Actions by the Server Device Responsive to Receiving the Definition

The server device may store, in a database disposed within the remote network management platform that contains representations of configuration items associated with the managed network, the definition of the new class of configuration item. The server device may perform other operations responsive to receiving the definition of the new class of configuration item. For instance, the server device might be further configured to send, to the database, an indication to automatically facilitate identification of configuration items that belong to the new class of configuration item. In some examples this indication may include causing the remote network management platform to perform discovery directed to the new class of configuration item.

In these examples, the server device may communicate, by way of a proxy server application operable on a proxy server device that is disposed within the managed network, with computing devices that are disposed within the managed network. The server device may receive, by way of the proxy server application, representations of configuration items of the new class, wherein the representations include values of at least some attributes associated with each of the configuration items. The server device may then store representations of the determined configuration items in the database.

The server device may also, subsequent to storing the definition of the new class of configuration item in the database, receive, by way of the proxy server application, an indication that a representation of a particular configuration item of the new class is to be modified. For instance, as described above with regard to FIG. 6F, an authoritative device may attempt to modify an attribute associated with the new class of configuration item. The server device may verify that the proxy server application is an authoritative device, as specified by way of the reconciliation pane, that is permitted to modify the particular configuration item. The server device may also write the modification of the particular configuration item to the database.

d. Other Variations and Embodiments

The systems and methods described above may be carried out by any number of components within an aPaaS system that manages one or more managed networks. As such, it should be understood that the steps described above in relation to FIG. 7 may be carried out other ways than those explicitly disclosed. Accordingly, a system may include means for a providing a GUI including a sequence of panes as described above with regard to FIGS. 6A, 6B, 6C, 6D, 6E, and 6F. The system may further include means for receiving, by way of the GUI, a definition of a new class that uniquely identifies a particular type of configuration item. The system may also include means for storing the definition of the new class.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to belong to the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
a hardware processor; and
a non-transitory memory storing instructions that, when executed by the hardware processor, cause the hardware processor to perform operations comprising:
displaying, via a graphical user interface (GUI), a first section, wherein the first section comprises a first set of data fields configured to receive a first set of inputs associated with a plurality of configuration items (CIs), and wherein the plurality of CIs are representative of:
one or more software applications;
one or more hardware components; and
one or more relationships among the one or more software applications, the one or more hardware components, or both;
receiving, via the GUI, one or more first inputs of the first set of inputs;
displaying, via the GUI, a second section, wherein the second section comprises a second set of data fields configured to receive a second set of inputs associated with the plurality of CIs, wherein the second section is not displayed until the one or more first inputs have been received;
receiving, via the GUI, one or more second inputs of the second set of inputs; and
storing one or more attributes of the plurality of CIs in a configuration management database (CMDB) based on the one or more first inputs and the one or more second inputs.

2. The system of claim 1, wherein the one or more first inputs have been received when all of the first set of data fields receive the first set of inputs, and wherein the one or more second inputs have been received when all of the second set of data fields receive the second set of inputs.

3. The system of claim 1, wherein the one or more first inputs is less than a first quantity of respective first inputs for all of the first set of data fields, and wherein the one or more second inputs is less than a second quantity of respective second inputs for all of the second set of data fields.

4. The system of claim 1, wherein the first set of inputs are associated with an identifier of a class of the plurality of CIs.

5. The system of claim 1, wherein the second set of inputs are associated with the one or more attributes of the plurality of CIs.

6. The system of claim 1, wherein the operations comprise:
displaying, via the GUI, a third section, wherein the third section comprises a third set of data fields configured to receive a third set of inputs associated with the plurality of CIs, wherein the third section is not displayed until the one or more second inputs of the second set of inputs have been received; and
receiving, via the GUI, one or more third inputs of the third set of inputs.

7. The system of claim 6, wherein the third set of inputs define a set of rules for identifying a new class of the plurality of CIs.

8. The system of claim 1, wherein the first set of data fields and the second set of data fields are configured to receive respective inputs via a text field, a drop down menu, a pop-up menu, or a combination thereof.

9. The system of claim 1, wherein the plurality of CIs are representative of one or more configurations of the one or more software applications, the one or more hardware components, or both.

10. The system of claim 1, wherein each software application of one or more software applications is representative of one or more processes, one or more threads, one or more programs, one or more client modules, or one or more server modules, or any combination thereof, configured to execute on a device or a group of devices.

11. A method, comprising:
displaying, via a graphical user interface (GUI), a first section, wherein the first section comprises a first set of data fields configured to receive a first set of inputs associated with a plurality of configuration items (CIs), and wherein the plurality of CIs are representative of:
one or more software applications;
one or more hardware components; and
one or more relationships among the one or more software applications, the one or more hardware components, or both;
receiving, via the GUI, one or more first inputs of the first set of inputs;
displaying, via the GUI, a second section, wherein the second section comprises a second set of data fields configured to receive a second set of inputs associated with the plurality of CIs, wherein the second section is not displayed until the one or more first inputs have been received;
receiving, via the GUI, one or more second inputs of the second set of inputs; and
storing one or more attributes of the plurality of CIs in a configuration management database (CMDB) based on the one or more first inputs and the one or more second inputs.

12. The method of claim 11, wherein the one or more first inputs have been received when all of the first set of data fields receive the first set of inputs, and wherein the one or more second inputs have been received when all of the second set of data fields receive the second set of inputs.

13. The method of claim 11, wherein the one or more first inputs is less than a first quantity of respective first inputs for all of the first set of data fields, and wherein the one or more second inputs is less than a second quantity of respective second inputs for all of the second set of data fields.

14. The method of claim 11, wherein the first set of inputs are associated with an identifier of a class of the plurality of CIs.

15. The method of claim 11, wherein the second set of inputs are associated with the one or more attributes of the plurality of CIs.

16. The method of claim 11, wherein each software application of one or more software applications is representative of one or more processes, one or more threads, one or more programs, one or more client modules, or one or more server modules, or any combination thereof, configured to execute on a device or a group of devices.

17. A non-transitory computer-readable medium comprising computer readable code, that when executed by one or more hardware processors, causes the one or more hardware processors to perform operations comprising:
displaying, via a graphical user interface (GUI), a first section, wherein the first section comprises a first set of data fields configured to receive a first set of inputs associated with a plurality of configuration items (CIs), and wherein the plurality of CIs are representative of:
one or more software applications;
one or more hardware components; and
one or more relationships among the one or more software applications, the one or more hardware components, or both;
receiving, via the GUI, one or more first inputs of the first set of inputs;
displaying, via the GUI, a second section, wherein the second section comprises a second set of data fields configured to receive a second set of inputs associated with the plurality of CIs, wherein the second section is not displayed until the one or more first inputs have been received;
receiving, via the GUI, one or more second inputs of the second set of inputs; and
storing one or more attributes of the plurality of CIs in a configuration management database (CMDB) based on the one or more first inputs and the one or more second inputs.

18. The non-transitory computer-readable medium of claim 17, wherein the one or more first inputs have been received when all of the first set of data fields receive the first set of inputs, and wherein the one or more second inputs have been received when all of the second set of data fields receive the second set of inputs.

19. The non-transitory computer-readable medium of claim 17, wherein the one or more first inputs is less than a first quantity of respective first inputs for all of the first set of data fields, and wherein the one or more second inputs is less than a second quantity of respective second inputs for all of the second set of data fields.

20. The non-transitory computer-readable medium of claim 17, wherein each software application of one or more software applications is representative of one or more processes, one or more threads, and one or more programs, one or more client modules, or one or more server modules, or any combination thereof, configured to execute on a device or a group of devices.

* * * * *